United States Patent [19]
Daute

[11] 3,947,755
[45] Mar. 30, 1976

[54] CIRCUIT FOR STABILIZING THE OPERATING VOLTAGE OF A SWEEP CIRCUIT FOR A CATHODE-RAY TUBE

[75] Inventor: Otto Daute, Landau, Pfalz, Germany

[73] Assignee: Licentia Patent-Verwaltungs-GmbH, Frankfurt, Germany

[22] Filed: Aug. 5, 1974

[21] Appl. No.: 494,857

[30] Foreign Application Priority Data
Aug. 9, 1973  Germany............................ 2340286

[52] U.S. Cl. ............ 323/43.5 S; 315/387; 315/411; 323/25
[51] Int. Cl.² ...................... G05F 1/20; H01J 29/70
[58] Field of Search ............ 323/43.5 S, 23, 25, 57; 315/364, 387, 395, 408, 411

[56] References Cited
UNITED STATES PATENTS

| | | | |
|---|---|---|---|
| 2,959,726 | 11/1960 | Jensen | 323/43.5 S |
| 3,094,654 | 6/1963 | Roelli | 323/23 |
| 3,259,835 | 7/1966 | McPherson | 323/25 |
| 3,263,157 | 7/1966 | Klein | 323/43.5 S |
| 3,384,803 | 5/1968 | Hardin et al. | 323/43.5 S |
| 3,514,688 | 5/1970 | Martin | 323/43.5 S |
| 3,729,673 | 4/1973 | Schneider | 323/43.5 S |

FOREIGN PATENTS OR APPLICATIONS
1,151,547  7/1963  Germany .............................. 323/57

*Primary Examiner*—Gerald Goldberg
*Attorney, Agent, or Firm*—Spencer & Kaye

[57] ABSTRACT

A circuit for stabilizing the operating voltage across a winding of output transformer of a sweep circuit of a cathode ray tube, including a plurality of current flow paths presenting resistances which are electronically controllable and each connected between a source of operating voltage which may fluctuate in amplitude and a respective one of a plurality of taps connected along the length of the winding, and a system for varying the resistances of the paths in response to changes in the amplitude of the operating voltage in such a manner as to maintain the voltage across the entirety of the winding substantially constant. The circuit is able to utilize inexpensive components while reducing overall energy losses.

13 Claims, 4 Drawing Figures

CIRCUIT FOR STABILIZING THE OPERATING VOLTAGE OF A SWEEP CIRCUIT FOR A CATHODE-RAY TUBE

BACKGROUND OF THE INVENTION

The present invention relates to the sweep circuitry of cathode-ray tubes and particularly to a circuit for stabilizing the operating voltage acting on the sweep transformer in the sweep circuit of a cathode-ray tube, more particularly for the line sweep circuit in a television receiver.

It is known that the line sweep output stage of a television receiver requires a stabilized operating voltage to produce a sufficiently constant sweep amplitude, even in the presence of a fluctuating mains, or supply, voltage. The circuit provided to produce the stabilized operating voltage must be able to dissipate the energy resulting as the difference between the two extreme modes of operation with minimum and maximum possible mains voltage and an approximately uniform current consumption. This energy to be handled by the current supply circuit is particularly high in color television receivers since these instruments require an operating current for the sweep circuit which is about three times greater than that required in black and white television receivers.

The use of a power supply unit including, for example, a regulated series transistor for this purpose is not possible without difficulty since currently available power transistors cannot process such high leakage energies without danger. Moreover, it would be necessary to use expensive transistors with very large cooling bodies, which is uneconomical.

Other power supply units, such as controlled thyristor power units for example, require additional measures, such as a choke for example, to reduce switching peaks in the thyristor, and such additional measures involve relatively high expenditures.

SUMMARY OF THE INVENTION

It is an object of the present invention to reduce the energy losses occurring in the mains portion of such circuit and to employ inexpensive commercially available control means, such as power transistors.

A further object is to protect such control means from damage by leakage energy by means involving only a small amount of circuitry.

These and other objects according to the invention are achieved by the provision, in a system for producing sweep voltages for deflecting the beam of a cathode ray tube, which system includes an operating voltage source whose output voltage is subject to amplitude variations, and an output transformer having a winding, with one end of the winding being normally connected to the voltage source, of an improved circuit for stabilizing the voltage across the winding. The improved stabilizing circuit according to the invention essentially includes a capacitor connecting the one end of the winding to a point of common potential for the system, at least one voltage-applying tap connected to the winding at a point between its ends, at least one electronically controllable variable resistance connected between the operating voltage source and the tap; a control unit connected to control the resistance of the variable resistance as a function of the voltage level across the winding, in a manner to maintain the voltage level across the winding substantially constant, and a diode connected in series with the variable resistance and poled to be conductive in the direction of flow of the sweep voltage-producing operating current in the system.

The present invention has the advantage that no additional circuitry is required to stabilize the operating voltage so that a simple one-way, or half-wave, rectification, for example, of the mains voltage can serve as the operating voltage source. The energy to be processed in the extreme case in the stabilizing circuit is less, by about the voltage reduction factor of the taps, than in a conventional power unit with a controlled series transistor and only one current path is conductive. The control means in the current paths must thus handle only a fraction of the maximum leakage power to be dissipated. Correspondingly, any cooling means which might possibly be required can be small and inexpensive.

DESCRIPTION OF THE PREFERRED EMBODIMENTS

Figure 1:
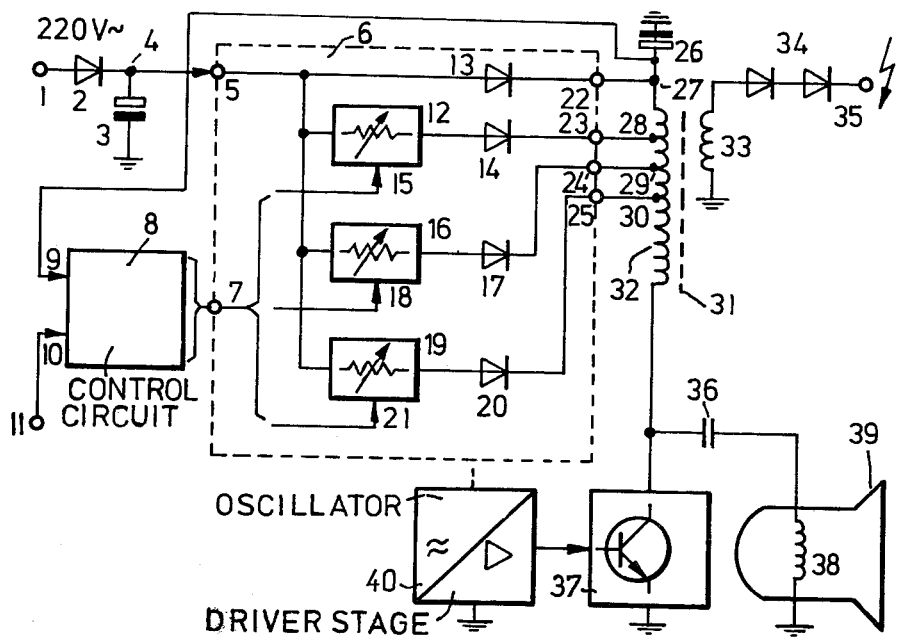
FIG. 1 is a block circuit diagram of a preferred embodiment of a circuit according to the present invention.

FIG. 1 shows, as a part of the circuitry of a color television receiver, the line sweep circuit and its current supply. The horizontal deflection coil 38 of the cathode-ray tube 39 is fed by a line sweep output stage 37 via a capacitor 36 which is also used to equalize deflection errors, or tangential errors. The stage 37 operates in a known manner together with the line sweep transformer according to the principle of energy recovery. A circuit 40 with an oscillator and a driver stage is provided in a known manner to control the line output stage.

The line output stage cooperates in a known manner with the primary, or operating, winding 32 of an output transformer 31. The secondary winding 33 of transformer 31 is connected in a known manner via high voltage rectifiers 34 to a terminal 35 at which the high voltage required for operation of the picture tube 39 can be obtained.

The above-described line sweep circuit is supplied with current by a circuit including a rectifier 2 and a charging capacitor 3. This half-wave rectifier circuit rectifies the alternating mains voltage of, for example, 220 volts present at terminal 1 so that at point 5 at the output of the rectifier 2 a direct voltage is available which, however, contains all of the fluctuations of the mains voltage because it is unregulated.

The line output stage is supplied with current in that, as required, the upper winding end 27 of the operating winding 32 of the transformer 31, or one of a plurality of taps 28, 29 and 30 of the operating winding is connected to switching point 4. The connection between the upper winding end and taps 28, 29 and 30, on the one hand, and switching point 4, on the other hand, is established by a control circuit 6 which constitutes part of the circuit of the present invention.

The input 5 of control circuit 6 is connected directly to the output 4 of the rectifier circuit. From this input 5, four current paths branch out in the control circuit 6 of the present embodiment and these paths lead respectively to outputs 22, 23, 24 and 25 of the control circuit 6 and to respective one of the various taps 27, 28, 29 and 30 of the operating winding 32 of the transformer 31, the upper winding end 27 of the operating winding being connected to ground via a capacitor 26.

The current path connected to the upper winding end 27 of the operating winding 32 includes a diode 13 while the other current paths each include a respective one of the electronically controllable resistors 12, 16 and 19. The control inputs 15, 18 and 21 of resistors 12, 16 and 19 are connected, via input terminal or terminals 7, to the respective outputs of a control circuit 8.

This control circuit 8 has a first input 9 which is connected to switching point 27 and a second input 10 which is connected to a terminal 11 to which is applied a reference voltage $U_{Ref}$. The control circuit 8 is constructed so that when the voltage at input 9 drops, resistors 12, 16 and 19 become current conductive one after the other.

Circuit 8 operates as follows: The circuit is dimensioned so that at the highest occurring mains voltage resistors 12, 16 and 19 will not be current conductive but blocking. In this case the operating current, which substantially only compensates for the losses in the recovery circuit of the line output stage 37, flows via diode 13 to point 27 so that here a voltage of 300 volts, for example, can be measured at a high alternating mains voltage of usually 220 volts. This voltage serves as an effective operating voltage for the line output stage 37, and care must be taken that this voltage is stabilized. If the mains voltage drops by a certain amount the operating voltage active at point 27 would also drop and change the television picture.

In the circuit according to the invention, however, when the voltage drops at point 27, resistor 12 will become increasingly conductive so that a voltage of, for example, 270 volts is applied via diode 14 to tap 28 of the operating winding 32. This voltage is stepped up accordingly from tap 28 to the upper winding end 27 so that, with the appropriate dimensions of the winding ratio, 300 volts are again measured at end 27. The line output stage is thus supplied with the originally effective operating voltage of 300 volts.

The process described as stepping up can be explained as follows: If the transistor operating as a switch in synchronism with the line sweep frequency is conductive in stage 37, then a voltage is present between this switch and the presently conductive current path in circuit 6, which voltage is stepped up according to the number of turns of the remaining winding portion between the tap associated with that current path and point 27. This voltage is present at the capacitor 26 which acts as a booster capacitor and which maintains this voltage in effect for the time during which the switch of stage 37 is not conductive.

Diode 13 is blocked in the described case of operation, since a voltage of +270 volts is present at the anode of diode 13 and a voltage of +300 volts at its cathode.

If the voltage at input 9 of the control circuit 8 drops even further, the current paths with resistors 16 and 19 become conductive one after the other, diodes 13, 14 and 17 of the preceding current paths being blocked. In the present case a minimum alternating mains voltage will provide, for example, a voltage of 210 volts for tap 30. With respect to the line output stage, this voltage acts the same as a voltage of 300 volts at point 27. By continuously controlling resistors 12, 16 and 19 it becomes possible to prevent the operating voltage, which is active at point 27, from jumping so that it remains almost constant.

Figure 2:
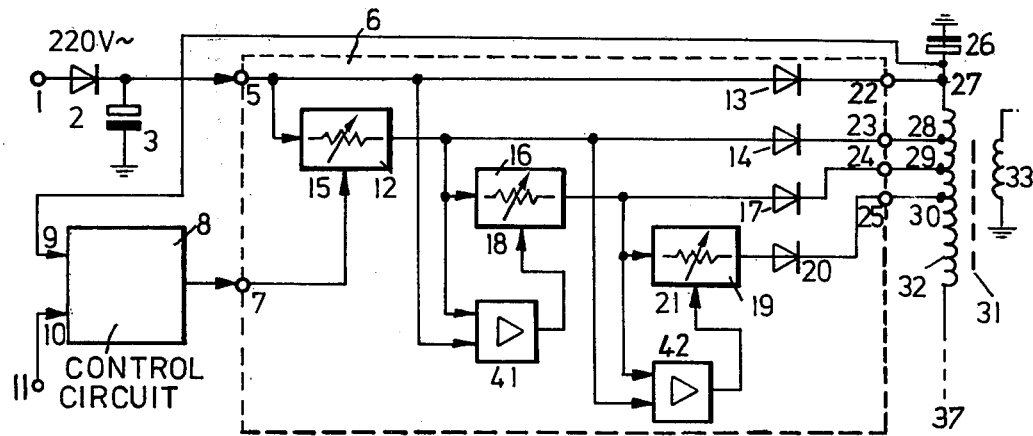
FIG. 2 is a block circuit diagram of a further embodiment of the circuit according to the invention.

FIG. 2 shows another advantageous embodiment of the circuit of the present invention. The same reference numerals as in FIG. 1 indicate components with the same or a similar function. For reasons of clarity the stage 37 which is connected to the operating winding 32 of the transformer 31, diodes 34 and the picture tube 39 are not shown.

The control circuit 6 again contains four current paths which are connected to taps 27, 28, 29 and 30 of the operating winding 32. The current inputs of resistors 12, 16 and 19 are not all connected directly to input 5 of control circuit 6. The above-mentioned resistors are connected in such a way that resistor 12 is connected to input 5, while the input of resistor 16 is connected to the output of resistor 12 and the input of resistor 19 is connected to the output of resistor 16.

The input 9 of control circuit 8 is connected to switching point 27 as in the circuit of FIG. 1. The output of control circuit 8 does not control all resistors 12, 16 and 19 directly at their control inputs, but directly controls only resistor 12 via its control input 15. The control of resistor 16 at its control input 18 is effected via a control stage 41 between whose inputs there appears the voltage across resistor 12. Similarly, the conductivity of resistor 19 is controlled by the output signal from a control stage 42, between whose inputs there appears the voltage present across resistor 16.

If the voltage at input 9 of control circuit 8 has become so low that resistor 12 presents a very low resistance value, then stage 41 produces at its output a control voltage which controls resistor 16, via its control input 18, to make it increasingly conductive.

If the voltage across resistor 16 continues to decrease because of a further reduction in the amplitude of the alternating mains voltage, resistor 19 is also made increasingly conductive, by the output signal from stage 42 applied to the control input 21 of resistor 19. Correspondingly, the above-described process is reversed if the mains voltage rises again.

Diodes 13, 14, 17 and 20 simultaneously prevent passage of the high return voltage from line transformer 31 to control circuit 6 and control circuit 8.

In the above-described two embodiments of the invention shown in FIGS. 1 and 2, the controllable resistors need dissipate only a fraction of that power leakage which in prior art circuits would have to be dissipated by a single power control means.

Figure 3:
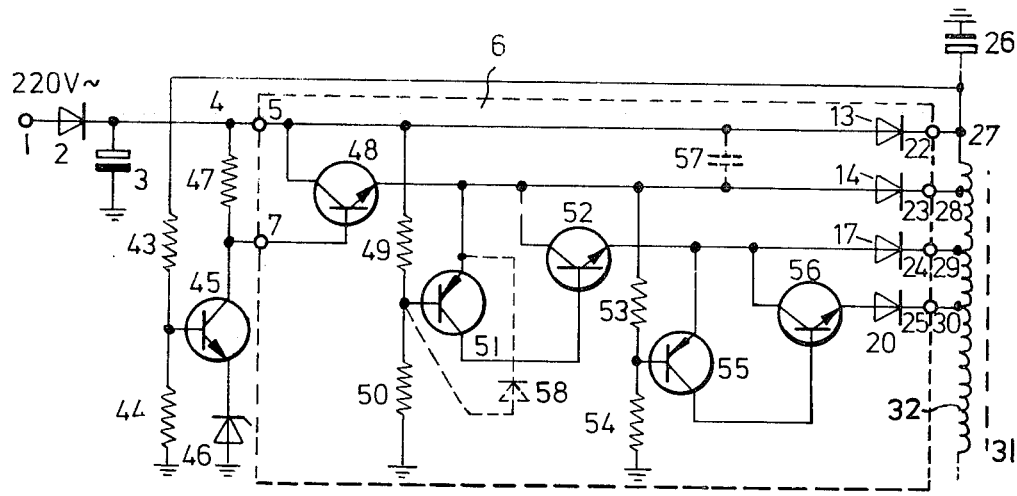
FIG. 3 is a circuit diagram of one form of construction for the block circuit diagram of FIG. 2.

FIG. 3 shows a preferred form of construction for the circuits 6 and 8 shown in block form in FIG. 2. The control circuit 8 of FIG. 2 includes, in FIG. 3, a transistor 45, in whose emitter circuit there is connected a Zener diode 46 which produces the reference voltage, $U_{Ref}$. The base of transistor 45 is connected to switching point 27 via a voltage divider including resistors 43 and 44. The control voltage which is fed to the input 7 of control circuit 6 is obtained at the collector resistor 47 of transistor 45.

The controllable resistor 12 of FIG. 2 is formed by a transistor 48 whose base is connected to the input 7 of control circuit 6. The collector of transistor 48 is connected to input 5 and its emitter is connected to tap 28 via diode 14. The resistor 16 in FIG. 2 is formed, in FIG. 3, by transistor 52 whose base is connected to the collector of a transistor 51 which operates as a control stage. The emitter of transistor 52 is connected to tap 29 via diode 17, while its collector is connected to the emitter of transistor 48. The base of transistor 51 is connected to the collector of transistor 48 via a voltage divider including resistors 49 and 50. The emitters of transistors 51 and 48 are connected together so that a voltage representative of the collector-emitter voltage of transistor 48 appears between the base and emitter of transistor 51.

The switching stage including transistor 56 is similar to the switching stage which has just been described. The emitter of this transistor is connected to the tap 30 of operating winding 32 via diode 20. The collector of transistor 56 is connected to the emitter of transistor 52, which lies in the preceding current path. The base of transistor 56 is controlled by the collector voltage of transistor 55, while the emitter of transistor 55 is connected to the emitter of transistor 52. The base of transistor 55 is connected to the collector of transistor 52 via a voltage divider including resistors 53 and 54.

In the above-described circuit of FIG. 3, the collector-emitter residual voltages of transistors 48 and 52 are monitored by means of transistors 51 and 55 and are utilized as control values for controlling the conductive states of transistors 52 and 56.

The taps of the operating winding 32 described in the above-mentioned circuit may also be the taps of an additional winding on the sweep transformer 31.

In the embodiment of FIG. 3 it is also possible to omit transistors 52 and 56 so that resistors 16 and 19 of FIG. 2 are constituted by transistors 51 and 55. On the other hand it is also possible to design the two transistors 51 and 52 as well as the two transistors 55 and 56 as a Darlington circuit and thus as integrated circuits with three external connections, i.e., base, transistor 51; emitter, transistor 52; collector, transistor 52.

In order to prevent the occurrence of voltage peaks in the current paths of the control circuit 6 during switching of the diodes, it is advantageous to connect the individual current paths to act as capacitors for filtering out the voltage peaks. A capacitor 57, shown in broken lines, can be provided for this purpose.

In order to prevent damage to the base-emitter section of the transistor 51 a protective diode 58 can be connected between the base and the emitter of said transistor 51.

Figure 4:
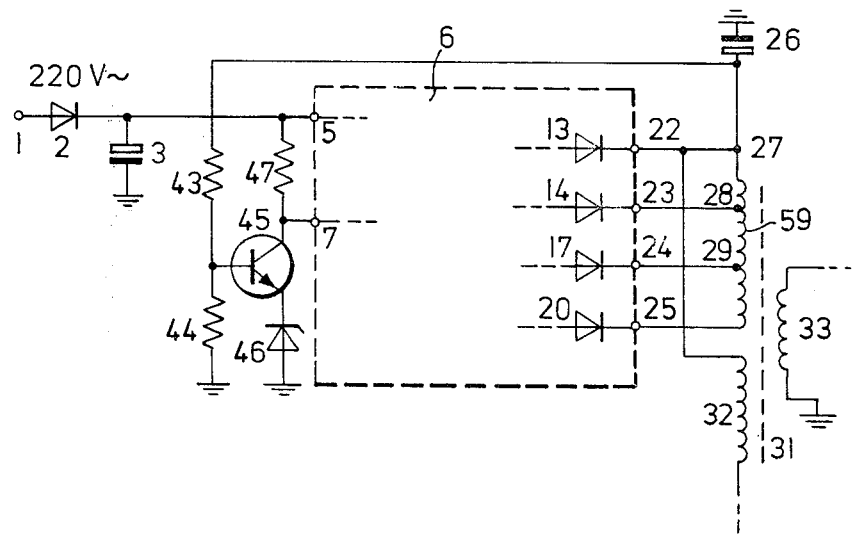
FIG. 4 is a circuit diagram of a further embodiment of the circuit according to the invention.

As shown in FIG. 4, which is a circuit diagram of a further embodiment of the invention, there is used an additional winding 59 which is provided with the voltage-applying taps 27, 28, 29.

It will be understood that the above description of the present invention is susceptible to various modifications, changes and adaptations, and the same are intended to be comprehended within the meaning and range of equivalents of the appended claims.

I claim:
1. In a system for producing sweep voltages for deflecting the beam of a cathode-ray tube, which system includes an operating voltage source whose output voltage is subject to amplitude variations, an output transformer having a winding, with one end of the winding being normally connected to the voltage source, a capacitor connecting the one end of the winding to a point of common potential for the system, a plurality of voltage-applying taps connected to the transformer at respectively different distances from the one end of the winding, and a circuit for connecting the operating voltage source to different ones of the taps, depending on the operating voltage amplitude, in order to stabilize the voltage across the transformer, the improvement wherein said circuit comprises: a plurality of electronically controllable variable resistance means each connected between said operating voltage source and a respective one of said taps; a plurality of diodes, each connected in series with a respective one of said variable resistance means and poled to be conductive in the direction of flow of the sweep voltage-producing operating current; and control means connected to control the conductive states of said variable resistance means, as a function of the amplitude of the operating voltage, in a manner such that upon the occurrence of successively lower operating voltage amplitude values, successive ones of said resistance means are rendered conductive in the order of the distance of their respective taps from said one end of said winding, starting from that one of said resistance means connected to that one of said taps which is closest to said one end of said winding.

2. An arrangement as defined in claim 1 wherein each said variable resistance means has one end connected to its associated tap via its respective diode and has its other end connected to the diode connected to the adjacent tap in the direction toward said one winding end, at the side of the latter diode directed away from its respective tap.

3. An arrangement as defined in claim 1 wherein each said resistance means after that one of said resistance means whose associated tap is nearest said one end of said winding is connected to receive as its control voltage the voltage drop across that one of said resistance means connected to the adjacent tap in the direction toward said one end of said winding.

4. An arrangement as defined in claim 1 comprising a further diode connected between the operating voltage source and said one end of said winding and poled to be conductive in the direction of flow of the sweep voltage-producing operating current.

5. An arrangement as defined in claim 1 wherein each said variable resistance means comprises a transistor whose variable resistance is present between its emitter and collector and whose base is connected to said control means.

6. An arrangement as defined in claim 5 wherein: said control means are connected to receive a reference voltage and a comparison voltage representative of that present at said one end of said winding; said control means has a control output connected to the base of that one of said transistors which is associated with the tap nearest said one end of said winding for rendering that transistor conductive when the operating voltage falls below a certain value.

7. An arrangement as defined in claim 6 wherein said control means comprises: a control transistor; a Zener diode connected to the emitter of said control transistor to provide the reference voltage; and a voltage divider having one end connected to said one end of said winding, with the base of said control transistor being connected to an intermediate point of said voltage divider, which intermediate point provides the comparison voltage.

8. An arrangement as defined in claim 5 wherein each said transistor other than the transistor whose associated tap is nearest said one end of said winding has its collector-emitter path connected between its associated tap and the point of connection between the tap adjacent its associated tap in the direction toward said one winding end and the transistor associated with said adjacent tap, and has its base connected to receive a control voltage corresponding to the collector-emitter voltage of the said transistor associated with said adjacent tap.

9. An arrangement as defined in claim 5 wherein said control means comprise a voltage divider having an intermediate point, the base of one said transistor which is associated with a tap other than the tap nearest said one end of said winding being connected to be controlled by the voltage at such intermediate point, the collector of said one of said transistors being connected to the adjacent tap in the direction toward said one winding end, the emitter of said one of said transistors being connected to its associated tap, and said voltage divider being connected between a point of the common potential for the system and the input of the transistor associated with the adjacent tap in the direction toward said one end of said winding.

10. An arrangement as defined in claim 9 wherein said control means further comprise an additional transistor having its base connected to said intermediate point of said voltage divider, its emitter connected to the collector of said one of said transistors, and its collector connected to the base of said one of said transistors.

11. An arrangement as defined in claim 10 comprising a protective diode connected between the base and the emitter of said additional transistor and poled in the direction opposite that of the base-emitter junction of said additional transistor.

12. An arrangement as defined in claim 1 further comprising a filter capacitor connected at the output side of at least one of said variable resistance means for suppressing switching voltage peaks.

13. An arrangement as defined in claim 1, further comprising an additional winding which winding is provided with said voltage-applying taps.

* * * * *